US008235849B2

(12) United States Patent
Cranston et al.

(10) Patent No.: US 8,235,849 B2
(45) Date of Patent: Aug. 7, 2012

(54) COMBINED CHAIN RING PROTECTOR AND CHAIN GUIDE

(75) Inventors: Ryan K. Cranston, Grand Junction, CO (US); James K. Rogers, Portland, OR (US)

(73) Assignee: Eko Sport, Inc., Grand Junction, CO (US)

( * ) Notice: Subject to any disclaimer, the term of this patent is extended or adjusted under 35 U.S.C. 154(b) by 0 days.

(21) Appl. No.: 12/201,627

(22) Filed: Aug. 29, 2008

(65) Prior Publication Data

US 2009/0062049 A1    Mar. 5, 2009

Related U.S. Application Data

(60) Provisional application No. 60/968,723, filed on Aug. 29, 2007.

(51) Int. Cl.
*B62J 13/00* (2006.01)
*B62M 9/12* (2006.01)

(52) U.S. Cl. .......... 474/144; 474/49; 474/101; 474/111; 474/134; 474/138; 474/140; 280/261; 280/304.3; 280/727

(58) Field of Classification Search .................. 474/144, 474/80, 82, 101, 116, 118, 127, 128, 134, 474/140, 135, 141, 160, 103, 403, 150
See application file for complete search history.

(56) References Cited

U.S. PATENT DOCUMENTS

| 1,400,131 | A |   | 12/1921 | Adams |         |
|-----------|---|---|---------|-------|---------|
| 1,636,327 | A |   | 7/1927  | Roe   |         |
| 3,835,729 | A |   | 9/1974  | Tarutani |      |
| 4,471,851 | A | * | 9/1984  | Kamiya et al. ............... 180/219 |
| 4,515,386 | A |   | 5/1985  | Tsujimura |     |
| 4,662,862 | A |   | 5/1987  | Matson |        |
| 4,946,426 | A | * | 8/1990  | Leonard ........................ 474/101 |
| 5,002,520 | A |   | 3/1991  | Greenlaw |      |
| 5,067,930 | A | * | 11/1991 | Morales ........................ 474/144 |
| 5,496,222 | A |   | 3/1996  | Kojima et al. | |
| 5,620,384 | A |   | 4/1997  | Kojima et al. | |
| 5,725,450 | A | * | 3/1998  | Huskey ......................... 474/116 |
| 5,728,018 | A |   | 3/1998  | Terada et al. | |

(Continued)

FOREIGN PATENT DOCUMENTS

DE        2058799        11/1970

(Continued)

*Primary Examiner* — Robert A Siconolfi
*Assistant Examiner* — San Aung
(74) *Attorney, Agent, or Firm* — Jason H. Foster; Kremblas & Foster

(57) ABSTRACT

A combined chain guide and chain ring protector for a bicycle for off-road use having a lower bracket sleeve, a chain ring around which a drive chain extends and a chain ring outer radius. The protector includes a mounting bracket secured at the lower bracket sleeve and a guard mounted thereto. An outer edge of the guard extends beyond the outer radius of the chain ring, thereby protecting a portion of the chain ring from inadvertent impacts. The chain guide extends from the mounting bracket along a path of the drive chain, and preferably includes an upper guide having an inner barrier positioned inboard of the bicycle chain an outer barrier positioned outboard of the inner barrier and an upper barrier positioned above the bicycle chain for preventing the chain from derailing from the chain ring in an upward direction.

25 Claims, 5 Drawing Sheets

U.S. PATENT DOCUMENTS

| | | | |
|---|---|---|---|
| 5,782,714 A | 7/1998 | Osgood | |
| 6,117,032 A | 9/2000 | Nankou | |
| 6,165,092 A | 12/2000 | Bramham et al. | |
| 6,533,690 B2 * | 3/2003 | Barnett | 474/140 |
| 7,066,856 B1 * | 6/2006 | Rogers | 474/144 |
| 2006/0199690 A1 | 9/2006 | Gardner et al. | |

FOREIGN PATENT DOCUMENTS

| | | |
|---|---|---|
| DE | 3417336 | 11/1985 |
| DE | 4126156 | 3/1992 |
| DK | 96297 | 7/1939 |
| NL | 7800724 | 7/1979 |
| SU | 1199696 | 12/1985 |

* cited by examiner

DETAIL
SCALE 1 : 1

DETAIL
SCALE 1 : 1

COMBINED CHAIN RING PROTECTOR AND CHAIN GUIDE

CROSS-REFERENCES TO RELATED APPLICATIONS

This application claims the benefit of U.S. Provisional Application No. 60/968,723 filed Aug. 29, 2007.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to devices for preventing damage to the chain ring, chain, crank and bottom bracket of a bicycle and devices that maintain the chain safely on the teeth of the chain ring. Specifically, the invention improves upon the prior art by uniquely integrating a chain guide with an improved chain ring protector.

2. Description of the Related Art

The forward portion of the bicycle drivetrain, consisting of the bottom bracket bearings, crank, chain ring, and chain is vulnerable to damage from underside impacts with rocks, stumps and other road and trail obstacles. The need to protect this part of the bicycle from such impacts, particularly during off-road cycling, has been addressed with round plates of metal or plastic that rotate with the chain ring and also with appliances that attach to the bicycle's lower frame tubes and act as a protective undercarriage.

An even more practical device is disclosed in U.S. Pat. No. 7,066,856, which is incorporated herein by reference, and which is assigned to the assignee of the current application. It consists of a bracket portion that mounts to the bottom bracket shell of the bicycle frame and a semi-circumferential guard portion that extends from the bracket to below the chain ring. The guard portion deflects trail obstacles that otherwise would damage the chain ring or other forward drivetrain components.

In addition to a device for protecting the chain ring from impacts, it is advantageous for the bicycle to be equipped with a device for maintaining the chain securely on the chain ring. The same rough terrain that presents underside obstacles capable of damaging the drivetrain can, when struck by the bicycle's wheels, jar the entire bicycle, thereby causing the chain to shake violently enough to derail it from the chain ring. A derailed chain can result in damage to mechanical components as well as inconvenience and even physical danger to the rider.

The need exists for a chain guide and chain ring protector. Other novel advantages of the combined device will become apparent in the following specification.

BRIEF SUMMARY OF THE INVENTION

A mounting bracket is preferably affixed to the bottom bracket shell of the bicycle. An upper chain guide is affixed to an upper extension of the bracket, and the upper guide preferably contains the chain on three sides of the chain: inner, outer and upper. A lower guide retains the chain on an idler pulley, forms a barrier against derailment during backpedaling and is attached to the mounting bracket. A guard with a portion extends downwardly from the mounting bracket past the chain ring and a relatively straight portion of the guard extends rearwardly along the lower chainline. The rearward bracket extension that provides the point of attachment for the lower guide also reinforces the structural integrity of the guard.

Figures 1A, 1B:
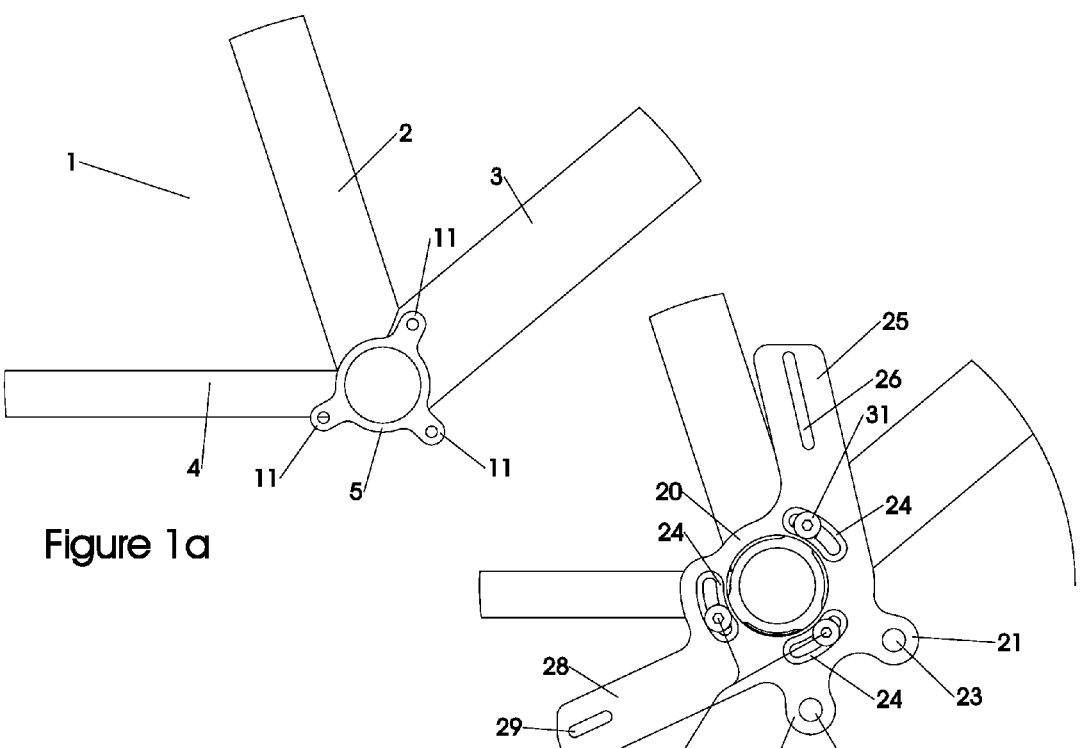
FIG. 1*a* is a side view illustrating a bicycle frame showing portions of the downtube, seat tube, right chainstay, and bottom bracket shell with integral bosses for chainguide attachment.
FIG. 1*b* is a side view illustrating the bracket of the present invention in its preferred embodiment, attached to the bosses of the bottom bracket shell.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

FIG. 1*a* shows a portion of a conventional bicycle frame 1 consisting of the seat tube 2, the downtube 3, and the right chainstay 4. The tubes join at the bottom bracket shell 5, which contains radial tabs, such as the bosses 11, for attachment of a chain guide, and through which a conventional crank rotatably extends. The terms "bottom bracket shell" and "lower bracket sleeve" are interchangeable.

Referring to FIG. 1*b*, the preferred embodiment of the mounting bracket 20 of the present invention is shown mounted in its operable position to the bottom bracket shell 5 by the screws 31 inserted through the arcuate slots 24 formed at spaced locations on the bracket 20, preferably aligned at International Standard Chain Guide (ISCG) mounting locations, for mounting to the bosses 11 on the bottom bracket shell 5 at ISCG positions. Although it is preferred for the slots 24 to be formed at ISCG locations, it should be noted that there may be other standards, including but not limited to the known ISCG 05 standard, which dictate the locations of mounting slots or other apertures, and may require fasteners, mounting devices or components thereof. Such standards are known to the skilled artisan to require alternative slot or aperture locations and/or mounting components, and such alternatives are substitutes for the preferred embodiment. Although it is preferred to mount the mounting bracket to the bottom bracket shell using screws or other fasteners, it is contemplated to clamp the mounting bracket in place against, or in close proximity to, the bottom bracket shell as described in U.S. Pat. No. 7,066,856, and particularly at column 4, lines 3-16, such as by a lip on the mounting bracket that is compressed between the bottom bracket cup and the bottom bracket shell of the frame.

Radial tabs with threaded apertures (the bosses 11) are shown formed at spaced locations around the bottom bracket shell 5 in FIG. 1*a* in accordance with the ISCG and ISCG 05 standards. However, it is also known to substitute for such radial tabs a wider shoulder (not illustrated), such as by forming a thicker shell wall or by merely extending the width of the radial tabs around the shell's entire periphery to form a contiguous radial lip, around the bottom bracket shell with threaded apertures at similarly spaced locations. Other alternatives are also known. The skilled person will recognize the modifications that are necessary to fasten the components of the invention to the alternative structures.

The upper extension 25 of the bracket defines the attachment slot 26 for attaching the upper guide of the chain guide, as discussed in more detail below. The lower extension 28 of the bracket defines the attachment slot 29 for attaching the lower guide of the chain guide. The bracket 20 further defines, on its perimeter, the lugs 21 with the holes 23 for attaching the guard 50.

Figure 2A:
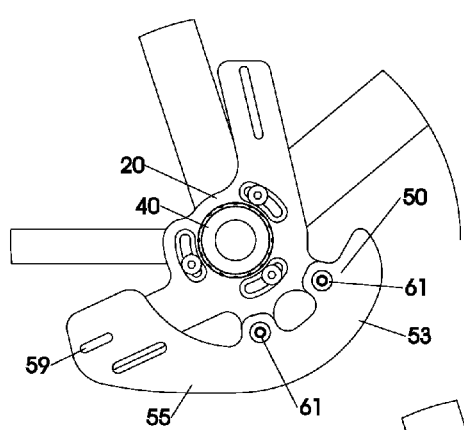
FIG. 2*a* is a side view illustrating the bracket and guard.

Referring to FIG. 2*a*, the cup of the bottom bracket bearing set 40 is shown installed to the bicycle frame 1 within the inner diameter of the bracket 20. The guard 50 is also secured at its semi-circumferential portion 53 to the lugs 21 of the bracket by the screws 61 extending through the holes 23 to attach to conventional nuts (not shown). Extending rearward from the semi-circumferential portion 53 of the guard is the straight portion 55, containing at its rearmost extremity the attachment slot 59. Preferably, the semi-circumferential portion 53 is integral with the straight portion 55. The guard 50 is preferably made of a tough, strong material, such as aluminum or polycarbonate.

Figure 2B:
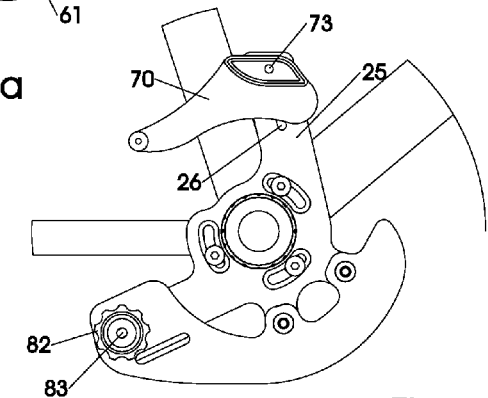
FIG. 2*b* is a side view illustrating the bracket with guard and inner members of upper and lower chain guides.

Referring to FIG. 2*b*, the inboard upper guide 70 contains the attachment hole 73, and the guide 70 is secured to the upward extension 25 of the bracket by a fastener, such as a screw, extending through the hole 73 and the slot 26. The idler pulley 82 likewise contains the hole 83 and the pulley 82 is rotatably mounted to the guard 50 and bracket 20 by extending a fastener, such as a screw, through the slots 29 and 59 and the hole 83.

Figure 2C:
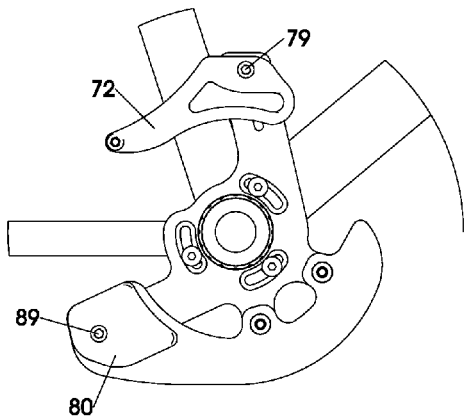
FIG. 2*c* is a side view illustrating the bracket with guard and upper and lower guides complete.

Referring to FIG. 2*c*, the outboard upper guide 72 is attached to both the inboard upper guide 70 and the bracket upper extension 25 by means of the screw, which preferably extends through the hole 73 and slot 26, and the nut 79 (not visible). The lower guide 80 is attached with the idler pulley (not visible in FIG. 2*c*) to both the guard 50 and bracket lower extension 28 by means of the screw, which preferably extends through the hole 83, the slot 59 and the slot 29, and the nut 89 (not visible).

Figure 3:
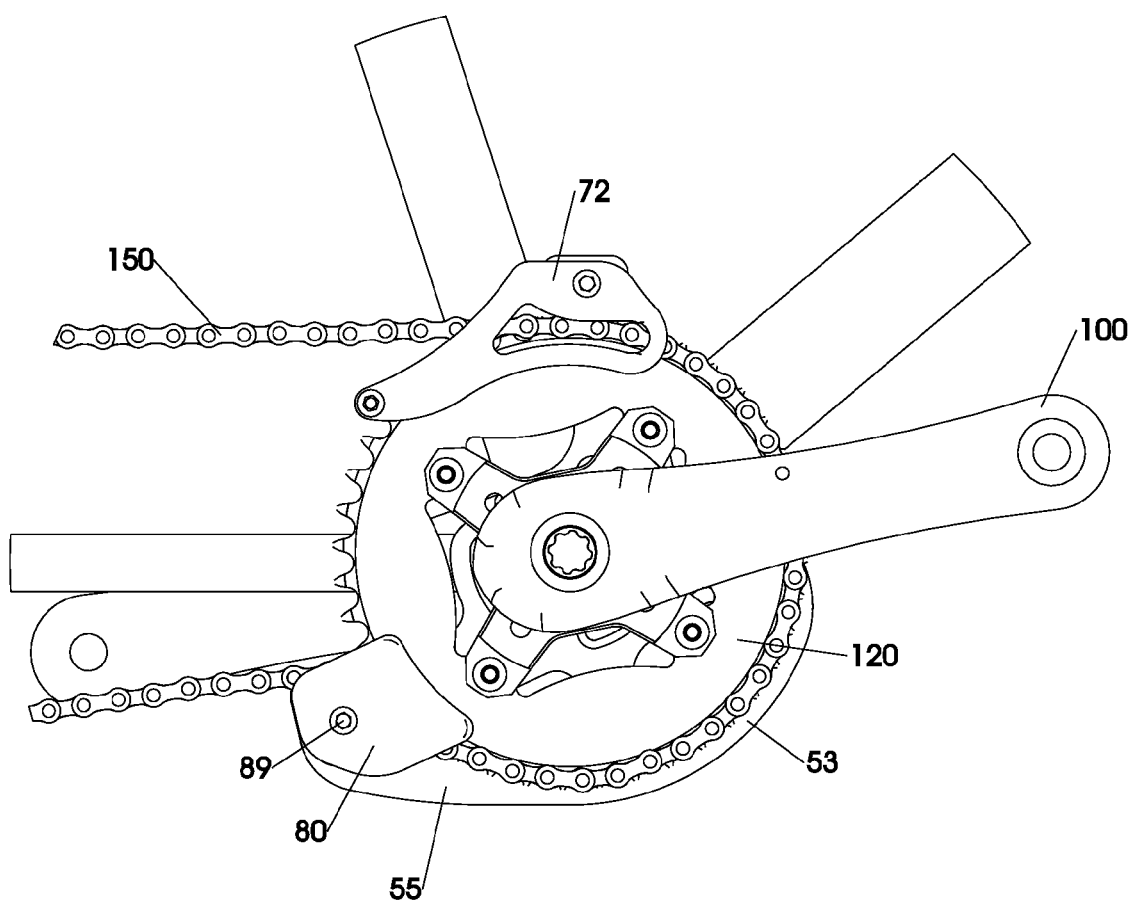
FIG. 3 is a side view illustrating the device with crank, chain ring, and chain.

Referring to FIG. 3, the device is seen fully mounted to cooperate with the crank 100, the chain ring 120, and the chain 150. The outboard upper guide 72 is positioned where the chain 150 engages the top of the chain ring 120 and is most vulnerable to shaking motion that could derail the chain from the chain ring. The lower guide 80 is positioned where the pulley 82 aligns with the teeth of the chain ring where the chain exits from the teeth of the chain ring during forward pedaling. Due to its position, the lower guide 80 ensures that the chain remains engaged with the chain ring over a larger part of the chain ring's perimeter than if the chain merely extended from the chain ring at the lowest point of the chain ring. The lower guide 80 also serves to prevent derailment, especially during backpedaling.

Still referring to FIG. 3, the semi-circumferential portion 53 of the guard 50 extends radially downwardly and outwardly past the chain ring along that portion of the chain ring most likely otherwise to suffer damage from underside impacts with obstacles as the bicycle moves forward. Preferably, the configuration of this portion of the apparatus is consistent with the configuration in U.S. Pat. No. 7,066,856, which is incorporated herein by reference. The straight portion 55 of the guard additionally protects the portion of the chain and chain ring that extends just rearward of the vertical centerline of the bottom bracket. The straight portion 55 of the guard further protects the lower guide 80 from damage from underside impacts.

Still referring to FIG. 3, the screw-and-nut 89 that attaches the lower guide and idler pulley (not visible in FIG. 3) to the bracket 20 also attaches the guard 50 to the bracket 20, providing support to the straight portion 55 of the guard and adding strength, rigidity and structural integrity to the assembly as a whole.

Figure 4A:
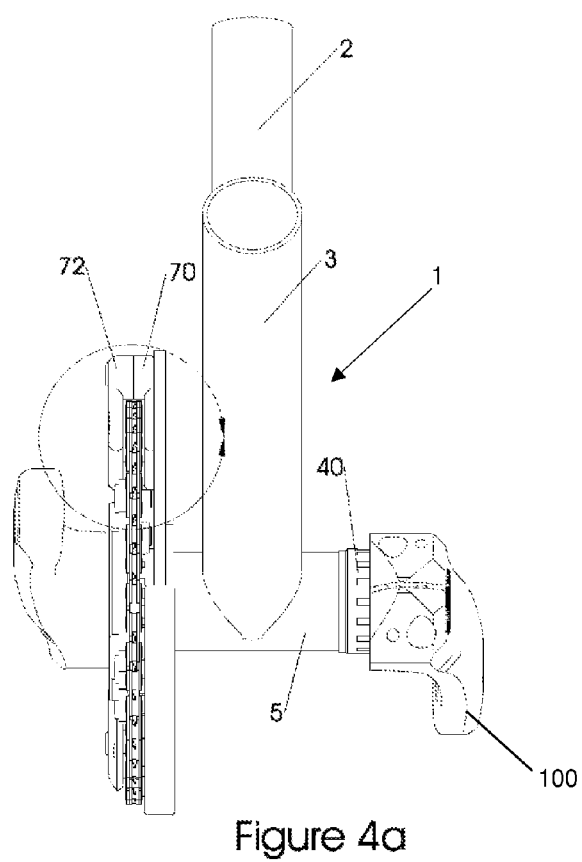
FIGS. 4*a* and *b* are front views illustrating the device with crank, chain ring, and chain.
Figure 4B:
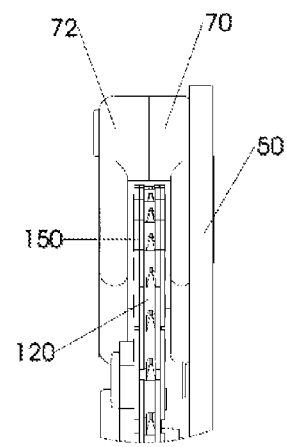

Referring to FIG. 4*a* and magnified view FIG. 4*b*, the device is seen from the front with crank 100, chain ring 120, and chain 150, which are moving parts that make up the drivetrain, along with the bottom bracket spindle and any other moving, bicycle-propelling components. The inboard upper guide 70 forms an inner barrier to prevent the chain 150 from derailing toward the bicycle frame 1. The outboard upper guide 72 forms an outer barrier that prevents the chain from derailing away from the bicycle frame 1. Additionally, the two guides 70 and 72 combined form an upper barrier to prevent the chain from being dislodged upwardly off the chain ring even if the chain is violently shaken.

Figure 5A:
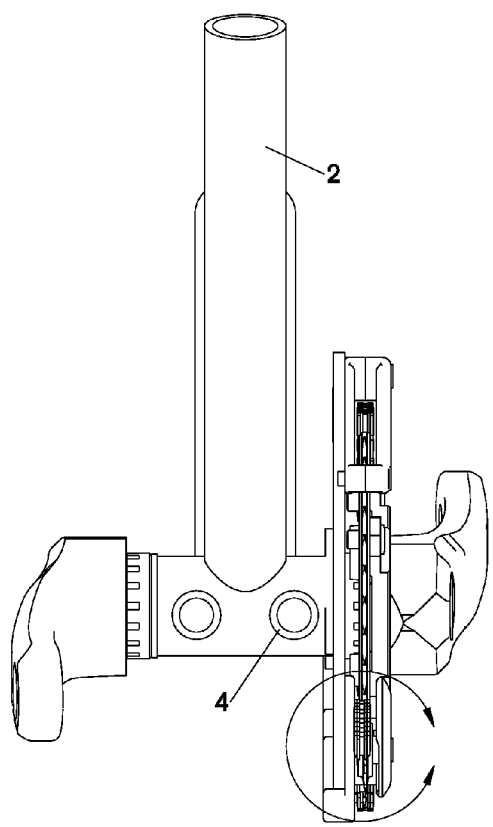
FIGS. 5*a* and *b* are rear views illustrating the device with crank, chain ring, and chain.
Figure 5B:
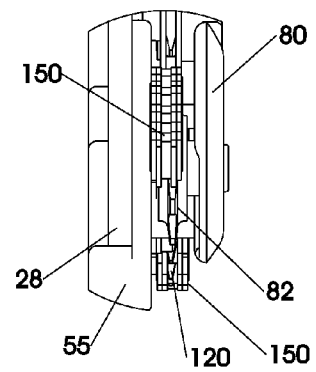

Referring to FIG. 5*a* and magnified view FIG. 5*b*, the device is seen from the back with crank 100, chain ring 120, and chain 150. The chain 150 wraps up and over the idler pulley 82, outboard of which is the lower guide 80 and inboard of which are the straight portion 55 of the guard 50 and the lower extension 28 of the bracket 20. The lower guide 80 forms an outer barrier against chain derailment. The chain tends to be retained and tensioned by the idler pulley 82, in addition to which the lower guide 80 forms a barrier to prevent the chain from derailing outboard away from the frame 1. It can also be seen that the straight portion 55 of the guard extends below the idler pulley 82, the chain 150 and the lower guide 80, thereby protecting these parts from damage from underside impacts.

Therefore, the bracket 20 is attached to the bottom bracket shell by mounting to the bosses 11 as described herein. This attachment forms an extremely strong structure that mounts the bracket 20 where it preferably makes no contact with drivetrain components. This is preferred so that the bracket 20 does not negatively impact bicycle operation, whether the bracket 20 is attached to the bosses 11 or by any of the alternative attachment structures. The guard 50 is attached to the bracket 20 at the perimeter lugs 21 and the lower extension 28. This configuration mounts the guard 50 to the bracket 20 with a very strong attachment, and extends the guard 50 rearwardly from the leading edge of the chain ring to significantly behind the chain ring to protect the lower chain guide components and chain. Such protection of the rearward components is extremely advantageous, and because of the cooperation between the guard components and the integrated guide components, this forms a stronger and more protective device. Thus, the invention is lighter, stronger and more protective of the bicycle components than the prior art devices or combinations of the prior art.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A combination bicycle chain ring protector and protected chain guide, the combination comprising:
   (a) a mounting bracket adapted to be secured non-rotatably adjacent a lower bracket sleeve of a bicycle frame, the mounting bracket having an aperture sized to permit a spindle to extend therethrough and a lower extension extending rearwardly from the aperture;
   (b) a guard detachably secured to the mounting bracket using at least one removable connector to allow the guard to be replaced without removing the mounting bracket from adjacent the lower bracket sleeve, wherein a rear portion of the guard mounts to the lower extension of the mounting bracket and wherein a semi-circumferential front portion of the guard extends forward of the aperture beyond an outer radius of an outermost chain ring on the bicycle, thereby protecting a portion of the outermost chain ring extending forward of and below the lower bracket sleeve from inadvertent impacts; and
   (c) at least one of the guard and the mounting bracket defining a substantially elongated slot, a lower chain guide pulley rotatably mounted to and outboard of the at least one of the guard and the mounting bracket by a fastener engaging the pulley and the slot, thereby allowing adjustment of the pulley along the slot, the lower chain guide pulley adapted to be disposed along a path of a drive chain extending around the chain ring, wherein the rear portion of the guard extends below the lower chain guide pulley and the lower extension, thereby protecting the lower chain guide pulley and the lower extension from inadvertent impacts.

2. The combination in accordance with claim 1, further comprising an upper guide comprising:
   (a) an inner barrier configured to be positioned inboard of the drive chain adjacent an engagement between the drive chain and the upper perimeter of the chain ring for preventing the drive chain from derailing from the chain ring in an inboard direction;
   (b) an outer barrier configured to be positioned outboard of the inner barrier for preventing the drive chain from derailing from the chain ring in an outboard direction; and
   (c) an upper barrier configured to be positioned above the drive chain and above the inner and outer barriers for preventing the drive chain from derailing from the chain ring in an upward direction.

3. The combination in accordance with claim 2, wherein the mounting bracket has an upper extension extending upwardly from the aperture, and wherein the upper guide is mounted to the upper extension.

4. The combination in accordance with claim 2, wherein:
   (a) the pulley is rotatably mounted to the lower extension, wherein the guard is secured to the lower extension only between the pulley and the lower extension; and
   (b) an outer barrier separate from the guard is positioned outboard of the pulley for preventing the drive chain from derailing from the chain ring in an outboard direction.

5. The combination in accordance with claim 4, wherein the mounting bracket has an upper extension extending upwardly therefrom.

6. The combination in accordance with claim 5, further comprising at least one mounting hole formed in the mounting bracket below the upper extension and at which the rear portion of the guard mounts, the mounted guard thereby defining a guard extension rearwardly of said at least one mounting hole, said guard extension having an outer edge configured to be spaced from and extending beyond the outer radius of the outermost chain ring for protecting the lower extension.

7. The combination in accordance with claim 5, wherein the mounting bracket defines a plurality of spaced mounting holes formed therethrough and adapted to be aligned with a plurality of radial tabs extending from the lower bracket sleeve.

8. The combination in accordance with claim 5, wherein the mounting bracket aperture is sized so that the mounting bracket contacts no drivetrain component when installed on the bicycle.

9. The combination bicycle chain ring protector and protected chain guide according to claim 1, wherein at least one of the guard and the mounting bracket extends below the outer barrier.

10. The combination bicycle chain ring protector and protected chain guide according to claim 9, wherein each of the guard and the mounting bracket extends below the outer barrier.

11. An improved bicycle for off-road use having a frame, including a lower bracket sleeve, and an outermost chain ring defining an outer radius around which a drive chain extends, the improvement comprising:
   (a) a chain ring protector comprising:
      (i) a mounting bracket secured non-rotatably adjacent the lower bracket sleeve, the mounting bracket having an aperture sized to permit a spindle to extend therethrough and a lower extension extending rearwardly from the aperture;
      (ii) a guard detachably secured to the mounting bracket using at least one removable connector to allow the guard to be replaced without removing the mounting bracket from adjacent the lower bracket sleeve, wherein a rear portion of the guard mounts to the lower extension of the mounting bracket and wherein a semi-circumferential front portion of the guard extends forward of the aperture beyond the outer radius of the outermost chain ring, thereby protecting a portion of the outermost chain ring extending forward of and below the lower bracket sleeve from inadvertent impacts;
   (b) at least one of the guard and the mounting bracket defining a substantially elongated slot, a lower chain guide pulley rotatably mounted to the at least one of the guard and the mounting bracket by a fastener engaging the pulley and the slot, thereby allowing adjustment of the pulley along the slot, the lower chain guide pulley being disposed along a path of the drive chain extending around the chain ring, wherein the rear portion of the guard extends below the lower chain guide pulley and the lower extension, thereby protecting the lower chain guide pulley and the lower extension from inadvertent impacts; and (c) an outer barrier separate from the guard and the pulley and secured to at least one of the guard and the mounting bracket adjacent and outboard of the pulley, wherein the outer barrier is adjustable with respect to the at least one of the guard and the mounting bracket.

12. The bicycle in accordance with claim 11, further comprising an upper guide comprising:

(a) an inner barrier positioned inboard of the drive chain adjacent an engagement between the drive chain and the upper perimeter of the chain ring for preventing the drive chain from derailing from the chain ring in an inboard direction;

(b) an outer barrier positioned outboard of the inner barrier for preventing the drive chain from derailing from the chain ring in an outboard direction; and (c) an upper barrier positioned above the drive chain and above the inner and outer barriers for preventing the drive chain from derailing from the chain ring in an upward direction.

13. The bicycle in accordance with claim 12, wherein the mounting bracket has an upper extension extending upwardly from the aperture, and wherein the upper guide is mounted to the upper extension.

14. The bicycle in accordance with claim 12, wherein:

(a) the pulley is rotatably mounted to the lower extension; and (b) an outer barrier is positioned outboard of the pulley for preventing the drive chain from derailing from the chain ring in an outboard direction.

15. The bicycle in accordance with claim 14, wherein the mounting bracket has an upper extension extending upwardly therefrom.

16. The bicycle in accordance with claim 15, further comprising at least one mounting hole formed in the mounting bracket below the upper extension and at which the rear portion of the guard mounts, the mounted guard thereby defining a guard extension rearwardly of said at least one mounting hole, said guard extension having an outer edge spaced from and extending beyond the outer radius of the outermost chain ring for protecting the lower extension.

17. The bicycle in accordance with claim 16, wherein the mounting bracket defines at least one mounting hole formed therethrough and aligned with at least one radial tab extending from the bottom bracket sleeve.

18. The bicycle in accordance with claim 17, wherein said at least one mounting hole comprises three holes and said at least one radial tab comprises three radial tabs extending from the lower bracket sleeve, each of said tabs having an aperture formed therein, and the mounting holes of the mounting bracket align with the apertures of the tabs.

19. The bicycle in accordance with claim 18, wherein the guard includes a plurality of slots formed therein and the guard is secured to the mounting bracket by fasteners extending through the slots.

20. The bicycle in accordance with claim 19, wherein the guard has an outer edge and the position of the outer edge with respect to an outer radius of the chain ring is adjustable by sliding the guard along the slots.

21. The bicycle in accordance with claim 18, further comprising means for adjusting the position of the guard relative to the mounting bracket for allowing the outer edge of the guard to be adjusted without removing the mounting bracket from the lower bracket sleeve.

22. The bicycle in accordance with claim 11, wherein the chain ring defines a plane, and the mounting bracket is aligned parallel to the plane.

23. The bicycle in accordance with claim 11, wherein the mounting bracket aperture is sized so that the mounting bracket contacts no drivetrain component.

24. The improved bicycle for off-road use having a frame, including a lower bracket sleeve, and an outermost chain ring defining an outer radius around which a drive chain extends according to claim 11, wherein at least one of the guard and the mounting bracket extends below the outer barrier.

25. The improved bicycle for off-road use having a frame, including a lower bracket sleeve, and an outermost chain ring defining an outer radius around which a drive chain extends according to claim 24, wherein each of the guard and the mounting bracket extends below the outer barrier.

* * * * *